(12) United States Patent
Duan et al.

(10) Patent No.: US 11,131,573 B2
(45) Date of Patent: Sep. 28, 2021

(54) OFFSET DETECTION FOR FUEL LEVEL SENSOR FAULT

(71) Applicant: GM GLOBAL TECHNOLOGY OPERATIONS LLC, Detroit, MI (US)

(72) Inventors: Shiming Duan, Ann Arbor, MI (US); Yao Hu, Sterling Heights, MI (US); Mutasim A. Salman, Madison, WI (US); Paul E. Krajewski, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 610 days.

(21) Appl. No.: 15/829,366

(22) Filed: Dec. 1, 2017

(65) Prior Publication Data
US 2019/0170565 A1    Jun. 6, 2019

(51) Int. Cl.
*G01F 25/00*   (2006.01)
*G01F 23/36*   (2006.01)

(52) U.S. Cl.
CPC ........ *G01F 25/0076* (2013.01); *G01F 23/363* (2013.01)

(58) Field of Classification Search
USPC ......................................................... 73/1.73
See application file for complete search history.

(56) References Cited

U.S. PATENT DOCUMENTS

| | | | | |
|---|---|---|---|---|
| 2009/0000375 A1* | 1/2009 | Johnson | ................ | G01F 23/363 73/317 |
| 2009/0277169 A1* | 11/2009 | Usoro | ..................... | F03G 7/065 60/527 |
| 2013/0112643 A1* | 5/2013 | Lecours | .................... | G01B 7/30 212/276 |
| 2014/0047896 A1* | 2/2014 | Griessbaum | .......... | G01S 7/4021 73/1.73 |
| 2014/0260520 A1* | 9/2014 | Schoenberg | .......... | G01F 23/246 73/1.73 |
| 2015/0068660 A1* | 3/2015 | Wang | ...................... | B29C 66/90 156/64 |
| 2015/0285670 A1* | 10/2015 | Takahashi | ............ | F02M 37/106 73/1.73 |
| 2016/0238702 A1* | 8/2016 | Muldowney | ............ | G01S 13/88 |
| 2016/0305852 A1* | 10/2016 | Oblizajek | ............. | G01M 17/06 |
| 2018/0134234 A1* | 5/2018 | Nickolaou | ........... | G03B 17/561 |

* cited by examiner

*Primary Examiner* — Peter J Macchiarolo
*Assistant Examiner* — Mohammed E Keramet-Amircolai
(74) *Attorney, Agent, or Firm* — Lorenz & Kopf LLP

(57) ABSTRACT

Methods and apparatus are provided for determining an offset detection for a fuel level sensor fault. The method includes receiving an electrical resistance reading from a potentiometer of a fuel level sensor and generating an estimated fuel level based on an established fuel usage table that references the electrical resistance reading. The fuel level sensitivity is calculated based on the change in electrical resistance readings divided by the change in the estimated fuel levels ($\Delta R/\Delta F$). The fuel level sensitivity is compared to a predetermined sensitivity curve to determine any necessary offset to the electrical resistance reading. Finally, the fuel usage table is updated with the offset to the electrical resistance reading.

20 Claims, 10 Drawing Sheets

OFFSET DETECTION FOR FUEL LEVEL SENSOR FAULT

TECHNICAL FIELD

The technical field generally relates to automotive sensors, and more particularly relates to an apparatus and method for offset detection of a fuel level sensor fault.

INTRODUCTION

Fuel level sensors provide readings of the amount of fuel in a fuel tank for vehicles and other similar machines. Incorrect readings or malfunctions with a fuel level sensor may result in an unexpected consumption of all the fuel in the tank. Consequently, the accuracy of a fuel level sensor is particularly important especially when the fuel level reaches lower levels. Over time, inaccuracies and errors may develop in fuel level sensors and as a result provide inaccurate readings.

Accordingly, it is desirable to provide an offset detection of a fuel level sensor fault. Furthermore, other desirable features and characteristics of the present invention will become apparent from the subsequent detailed description and the appended claims, taken in conjunction with the accompanying drawings and the foregoing technical field and background.

SUMMARY

A method is provided for determining an offset detection for a fuel level sensor fault. In one embodiment, the method includes: receiving an electrical resistance reading from a potentiometer of a fuel level sensor; generating an estimated fuel level based on an established fuel usage table that references the electrical resistance reading; calculating the fuel level sensitivity based on the change in electrical resistance readings divided by the change in the estimated fuel levels ($\Delta R/\Delta F$); determining any necessary offset to the electrical resistance reading by comparing the fuel level sensitivity to a predetermined sensitivity curve; and updating the fuel usage table with the offset to the electrical resistance reading.

A system is provided for calculating an offset detection for a fuel level sensor fault. In one embodiment, the apparatus includes: a fuel level sensor, comprising, a float arm that pivots to according to a change in the fuel level, a potentiometer connected to the base of the float arm, so a connector point of the potentiometer rotates according to the position of the float arm, a variable resistor in contact with the connector point of the potentiometer, where the variable resistor generates an electrical resistance reading that varies based on the position of the connector point; an electronic data storage device that contains a fuel usage table that estimates the fuel level by referencing the electrical resistance reading from the fuel level sensor; and an electronic microprocessor that, calculates fuel level sensitivity based on the change in electrical resistance readings divided by the change in the estimated fuel levels ($\Delta R/\Delta F$); determines any necessary offset to the electrical resistance reading by comparing the fuel level sensitivity to a predetermined sensitivity curve that is stored in the electronic data storage device, and updates the fuel usage table with the offset to the electrical resistance reading.

A vehicle is provided for calculating an offset detection for a fuel level sensor fault. In one embodiment, the apparatus includes: a fuel level sensor, comprising, a float arm that pivots to according to a change in the fuel level of a fuel tank for the vehicle, a potentiometer connected to the base of the float arm, so a connector point of the potentiometer rotates according to the position of the float arm, a variable resistor in contact with the connector point of the potentiometer, where the variable resistor generates an electrical resistance reading that varies based on the position of the connector point; an electronic data storage device that contains a fuel usage table that estimates the fuel level in the fuel tank by referencing the electrical resistance reading from the fuel level sensor; and an electronic microprocessor that, calculates fuel level sensitivity based on the change in electrical resistance readings divided by the change in the estimated fuel levels ($\Delta R/\Delta F$); determines any necessary offset to the electrical resistance reading by comparing the fuel level sensitivity to a predetermined sensitivity curve that is stored in the electronic data storage device, and updates the fuel usage table with the offset to the electrical resistance reading.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
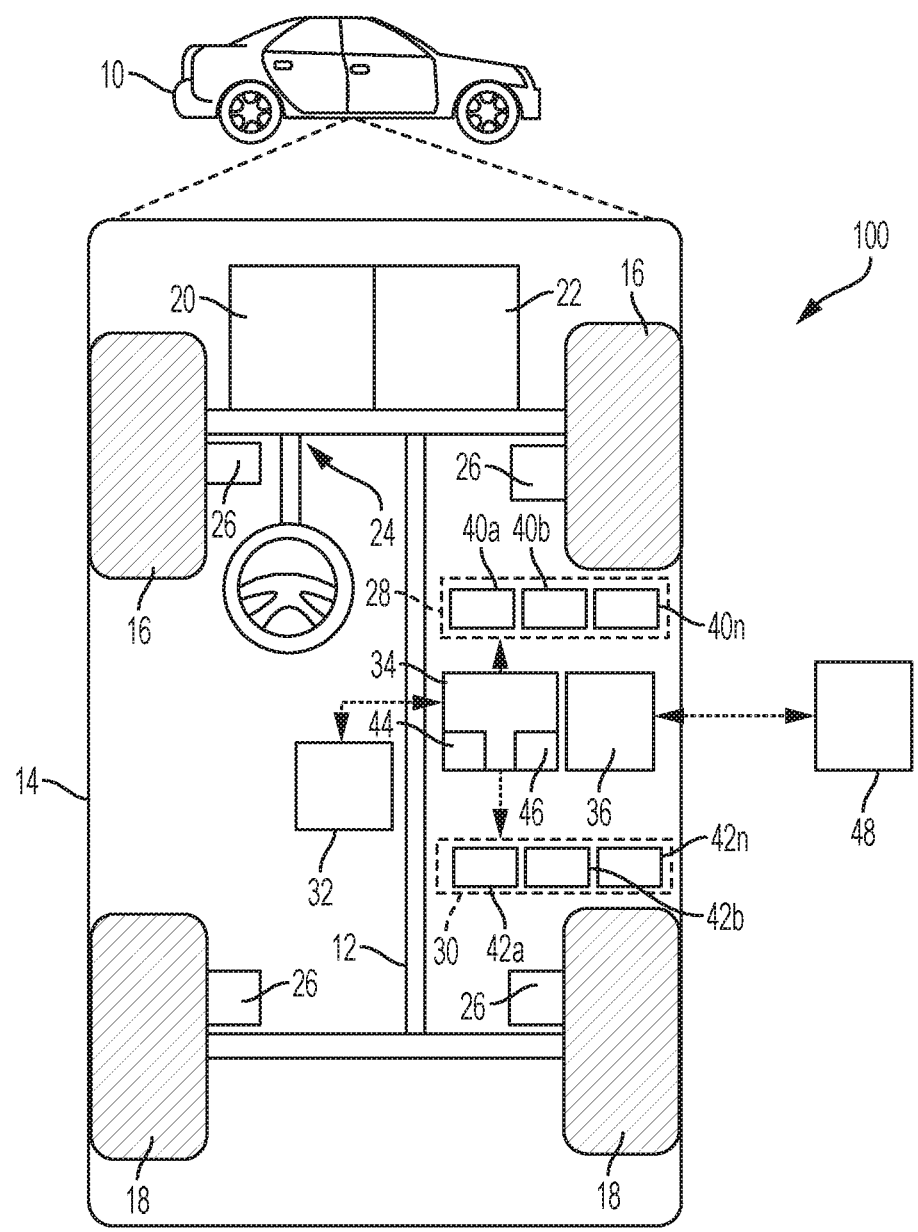
FIG. 1 shows a functional block diagram illustrating a vehicle having offset detection system for a fuel level sensor fault, in accordance with various embodiments.

With reference to FIG. 1, a fuel level sensor offset detection system shown generally at 100 is associated with a vehicle 10 in accordance with various embodiments. In general, the fuel level sensor offset detection system 100 determines the offset needed for the fuel level sensor.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments offset detection of a fuel level sensor fault system is incorporated into the vehicle 10. The vehicle 10 is, for example, a vehicle that is designed to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The fuel level sensor offset detection system 28 includes one or more sensing devices 40a-40n that sense observable conditions of the fuel system of the vehicle 10. The data storage device 32 stores data for use in automatically controlling the vehicle 10. As can be appreciated, the data storage device 32 may be part of the controller 34, separate from the controller 34, or part of the controller 34 and part of a separate system. The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10. In various embodiments, one or more instructions of the controller 34 are embodied in the fuel level sensor offset detection system 100 and, when executed by the processor 44, will detect an offset error in the fuel level sensor and compensate for that error.

Figure 2A:
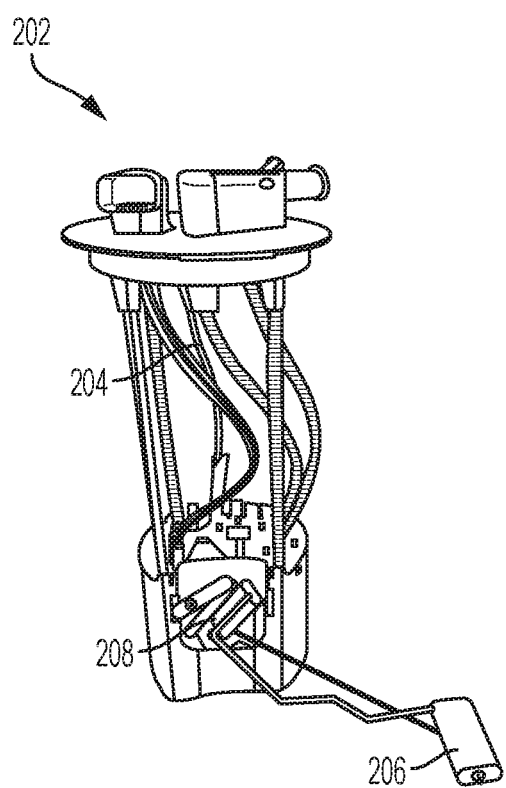
FIGS. 2A and 2B show diagrams of a fuel level sensor in different positions in accordance with an embodiment.
Figure 2B:
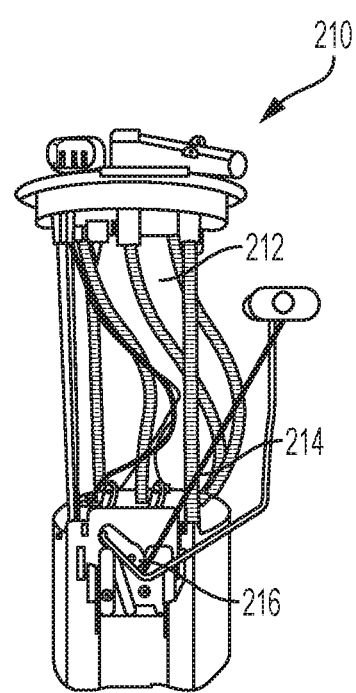

With reference to FIGS. 2A and 2B, diagrams 202 and 210 are shown of fuel level sensors 204 and 212 in accordance with an embodiment. As depicted in FIG. 2A, a fuel level sensor 204 is shown with a float arm 206 and potentiometer 208 in the "empty" position. As depicted in FIG. 2B, the fuel level sensor 212 is shown with a float arm 214 and potentiometer 216 in the "full" position. During normal operations, the float arm will move in accordance with the level in a fuel tank. The base of the float arm is connected to a potentiometer that will rotate to reflect the position of the float arm and the corresponding fuel level.

Figure 3:
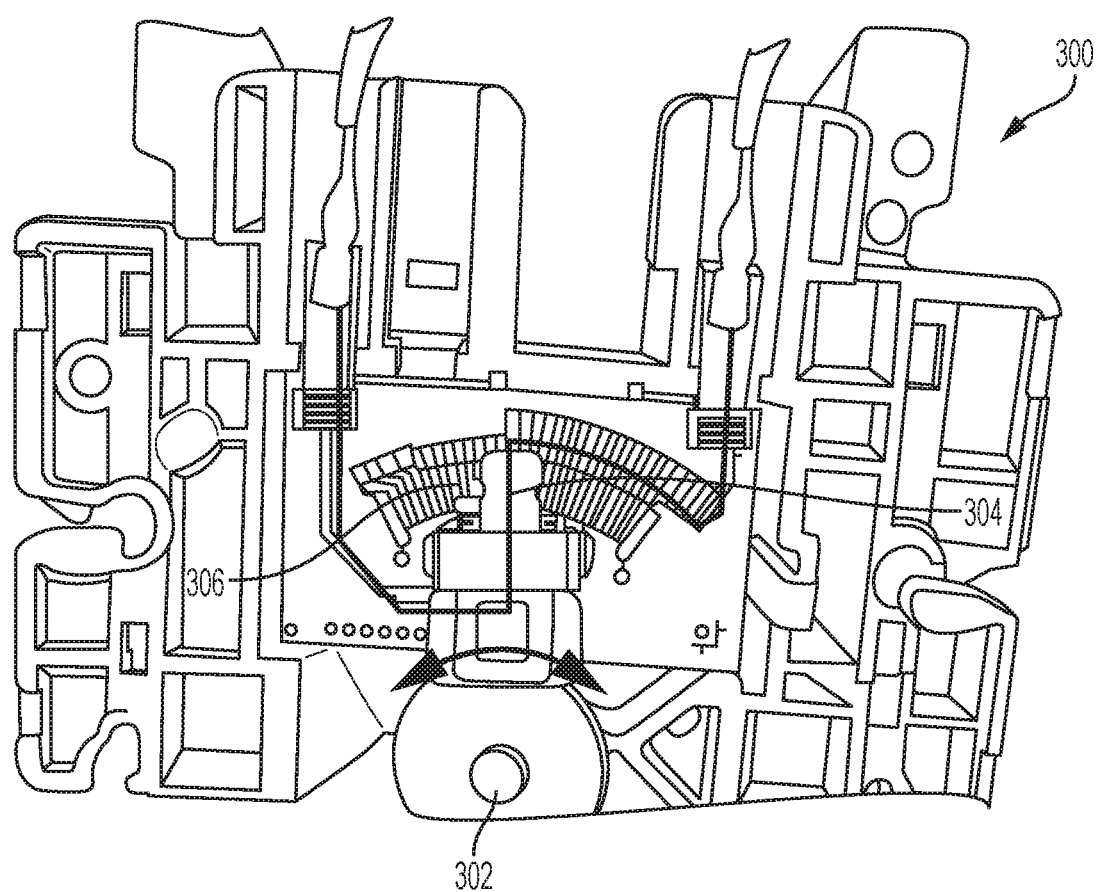
FIG. 3 shows a diagram of a potentiometer for use with the fuel level sensor in accordance with an embodiment.

With reference to FIG. 3, a diagram 300 of the potentiometer 302 used with the fuel level sensor is shown in accordance with an embodiment. As previously shown in FIGS. 2A and 2B, as the float arm of the fuel sensor rotates the potentiometer 302 to reflect the level in the fuel tank. The potentiometer includes a connector point 304 that makes electrical contact with a variable resistor 306. As the potentiometer 302 rotates the connector point 304 moves to different positions along the variable resistor 306. The different positions along the variable resistor creates a different electrical resistance reading at each position that reflects the level in the fuel tank.

Figure 4:
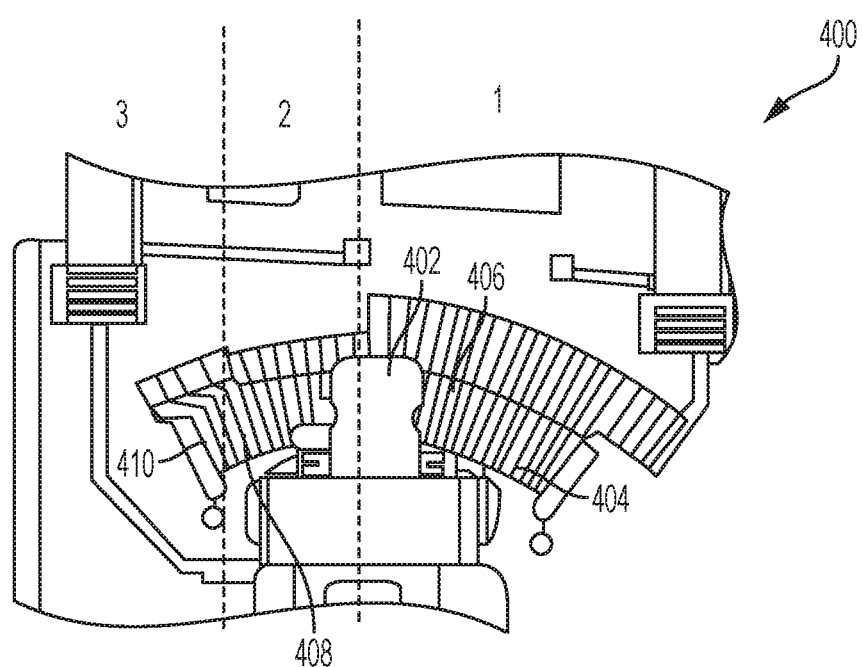
FIG. 4 shows a detailed diagram of different regions of the potentiometer in accordance with an embodiment.

With reference to FIG. 4, a detailed diagram 400 is shown of different regions 406, 408 and 410 for the variable resistor 404 of the potentiometer in accordance with an embodiment. As shown and described previously in FIG. 3, the connector point 402 of the potentiometer rotates along the variable resistor 404 to create a different electrical resistance to reflect the level in the fuel tank. In this embodiment, the variable resistor is divided into three distinct regions with each region having a different electrical resistance sensitivity. More specifically, the variable resistor has: an initial region 410; an intermediate region 408; and a final region 406. The initial region approximately represents the level in the first quarter of the fuel tank capacity, while the intermediate region approximately represents the middle half of the fuel tank capacity. The final region approximately represents the level in the fourth quarter of the fuel tank capacity. The electrical resistance sensitivities will vary between the regions with the final region being the most sensitive. In this embodiment, a greater sensitivity for the final region is used because of the criticality of a correct reading to avoid running out of fuel in the last quarter of the fuel tank capacity. In this embodiment as shown, the variable resistor will be at minimum electrical resistance value (Rmin) when the level of the fuel tank is full and at maximum electrical resistance (Rmax) when the level of the fuel tank is empty.

Figure 5:
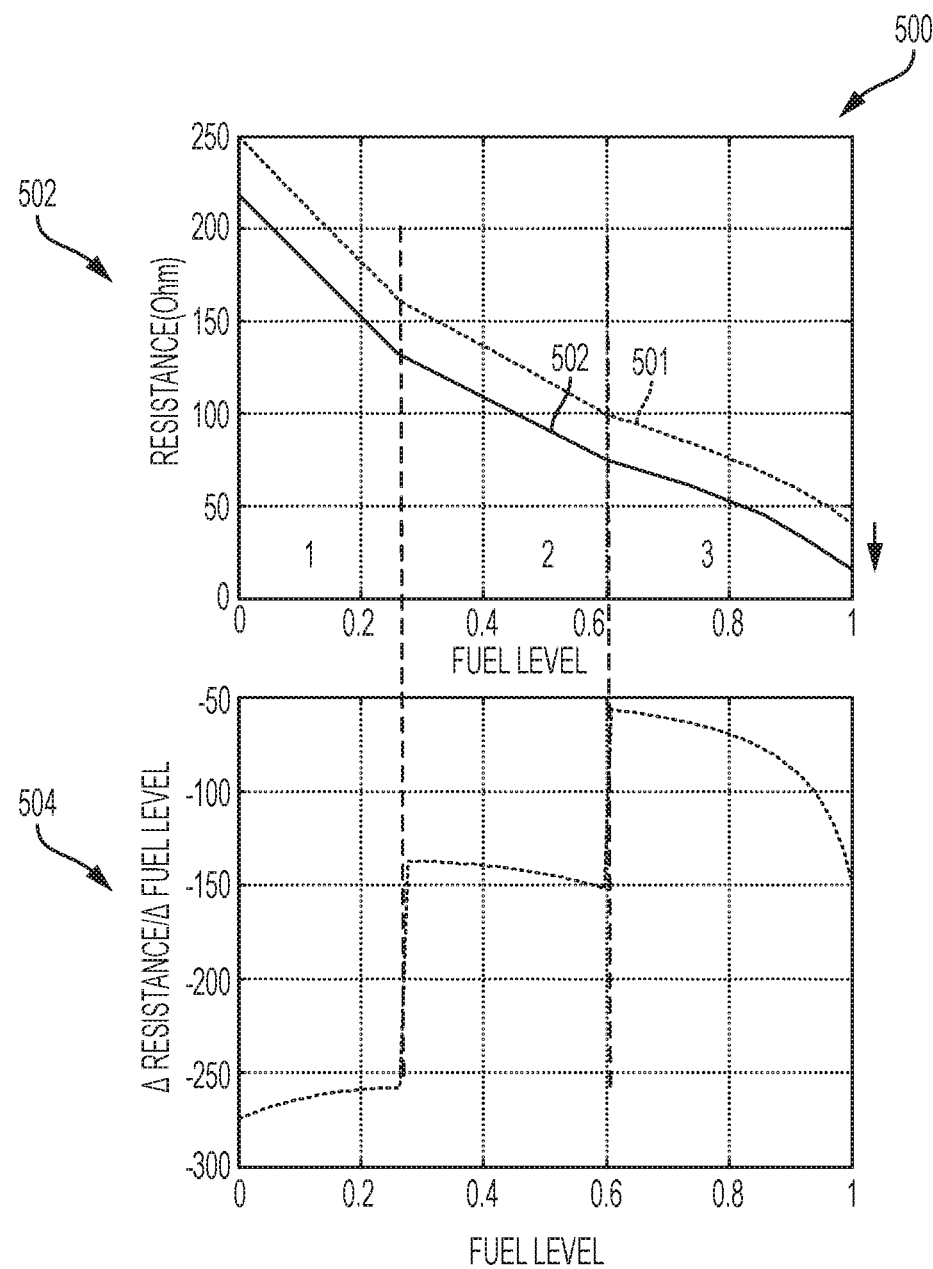
FIG. 5 shows a nonlinear fuel level sensor sensitivity curve ($\Delta R/\Delta F$) graph compared with a corresponding fuel level graph in accordance with an embodiment.

With reference to FIG. 5, linear and nonlinear graphs 500 are shown to measure the fuel level readings across the different regions of the variable resistor in accordance with one embodiment. The linear graph 502 depicts the values from a predetermined fuel usage table that is stored on electronic data storage device and used to estimate the fuel level based on the electrical resistance reading from the potentiometer. The graph 502 shows the electrical resistance value measured in Ohms ($\Omega$) versus the fuel level measured in a decimal value reflecting the fuel level (0=empty; 1=full). Two separate lines 501 and 502 are shown to reflect different readings in the fuel level readings. The first line 501 represents the "nominal" or reflected resistance value while the second line 502 represents the decreased or actual resistance value.

Relying solely on the nominal value may result in the operator of the vehicle believing the fuel level is greater than it actually is. An incorrect reading of the resistance may occur over time and may be the result of oxidation, a partial short, breakage on the variable resistor board, component temperature or other manufacturer variation. The incorrect reading may require an offset to the resistance value to reflect the true level of the fuel tank. However, the amount of offset may be hard to detect since there is no reference point unless the tank is completely empty or exactly at a full position.

Returning now to FIG. 5, a nonlinear graph 504 is shown as a sensitivity curve that represents the change in resistance value divided by the change in fuel level across the different regions of the variable resistor in accordance with one embodiment. In this graph 504, the change in resistance divided by the change in the fuel level ($\Delta R/\Delta T$) reflects the mathematical derivative (dR/dF) derivative of the value of the linear graph 502. The key point of the nonlinear graph 504 is that it's value does not change with any resistance error since it is based on the rate of change in the value of the resistance over the rate of change of the fuel level. An error in a nominal resistance value reading would not affect the corresponding sensitivity value. The nonlinearity of the sensitivity curve may be derived by varying the physical thickness of the variable resistor which allows for more sensitive resistance in the final region. Additionally, the nonlinearity sensitivity curve may be derived from the rotary connector point of the potentiometer that creates an inherent sine function mapping between the height (H) of the arm v. angle of the arm ($\theta$) multiplied by the length (L) of the arm (H=L*sin $\theta$).

As with the predetermined fuel usage table used to generate the linear graph 501, the values for the sensitivity curve of the nonlinear graph 504 are also stored in an electronic data storage device for later reference. In practice, the sensitivity curve 504 is compared to the nominal reading 501 of the linear graph 502. If an error is detected in the nominal reading, an offset is determined to bring the nominal reading in line with the expected fuel level reading as determined by the sensitivity curve.

Figure 6:
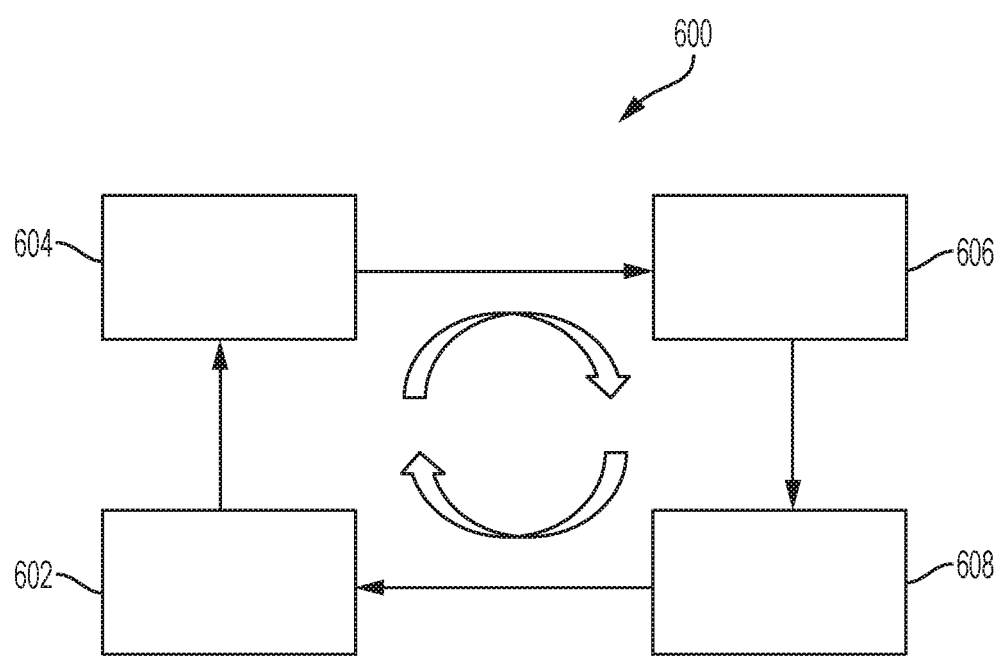
FIG. 6 shows a block diagram of the functioning of an offset detection system for fuel level sensor in accordance with one embodiment.

Turning now to FIG. 6, a block diagram 600 is shown that represents the function of an offset detection system in accordance with one embodiment. As shown, the process starts with monitoring of the fuel readings 602 by referencing the electrical resistance readings to a graph generated by the fuel usage table. Next, the calculated fuel level sensitivity curve 604 is referenced and compared to the estimated fuel level. If the estimated fuel level does not comply with the sensitivity curve, an offset for the fuel level is calculated 606 and provided as a correct fuel level reading. The offset value is then added as an update to the fuel usage table 608 to be used on the next fuel level reading. As shown, the process of calculating the offset and updating the fuel usage table may be continuous and ongoing throughout operation of the fuel level sensor.

Figure 7:
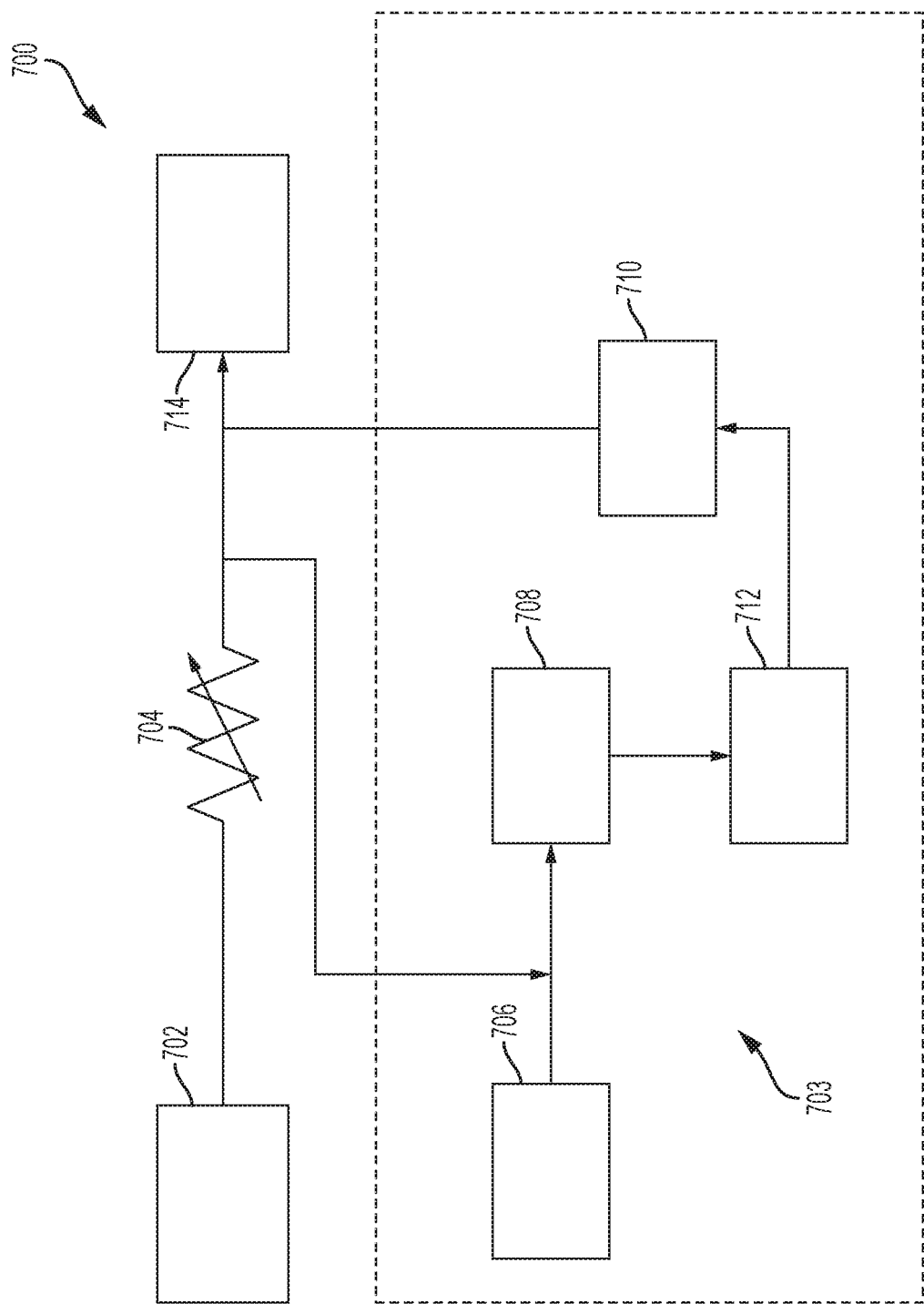
FIG. 7 shows a block diagram of an apparatus for detecting an offset for a fuel level sensor fault in accordance with one embodiment.

Turning now to FIG. 7, about block diagram 700 of an apparatus for detecting the offset for fuel level sensor fault is shown in accordance with one embodiment. In this embodiment, the fuel level sensor 702 takes a reading using the potentiometer 704 that represents the fuel level. The electrical resistance reading from the potentiometer 704 is provided to a processor and an electronic data storage device 703 that generates an estimated fuel level based on an established model fuel usage table 706. The estimated fuel level is plotted on the sensitivity curve 708 to determine any offset calculation 712. The offset is then used to update the fuel usage table 710 that calculates the correct offset fuel level output 714. The offset fuel level output 714 is typically provided to of fuel level indicator for a vehicle. In various embodiments, the fuel level indicator may be an analog or digital gauge. In alternative embodiments, the fuel usage table 710 may actually be two separate tables. The first table has a high resolution but may be subject to various faults. The second table may be used as a backup or "complementary" table. The second table will typically have a lower resolution than the first table. In other embodiments, the offset value of the first table will be updated based on the offset value of the second table.

Figure 8:
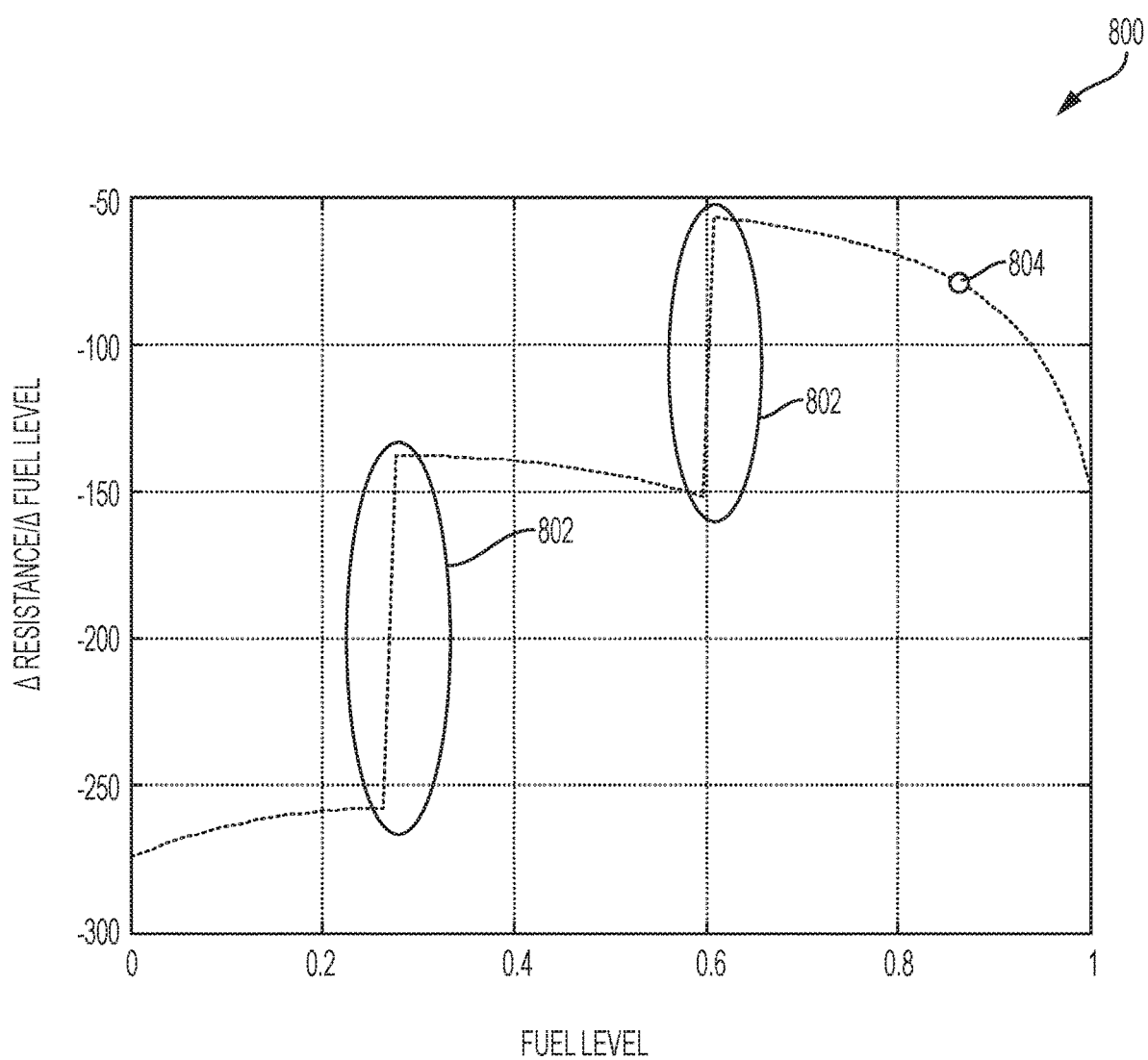
FIG. 8 shows a fuel level sensor sensitivity curve graph ($\Delta R/\Delta F$) for use with an offset detection algorithm for use with a fuel level sensor in accordance with one embodiment.

Turning now to FIG. 8, a graph 800 of a fuel level sensitivity curve is shown with reference points for calculating offset values in accordance with one embodiment. In some embodiments, the sensitivity curve may be used for offset detection at an edge point 802 or "boundary" between the variable resistor regions of the potentiometer. The edge points are used as a milestone check for better detection accuracy since the sensitivity of the resistor changes at these boundaries. In alternative embodiments, the fuel rate may be continuously monitored and checked based on the predetermined trajectory 804 within the various regions of the resistor.

Figure 9:
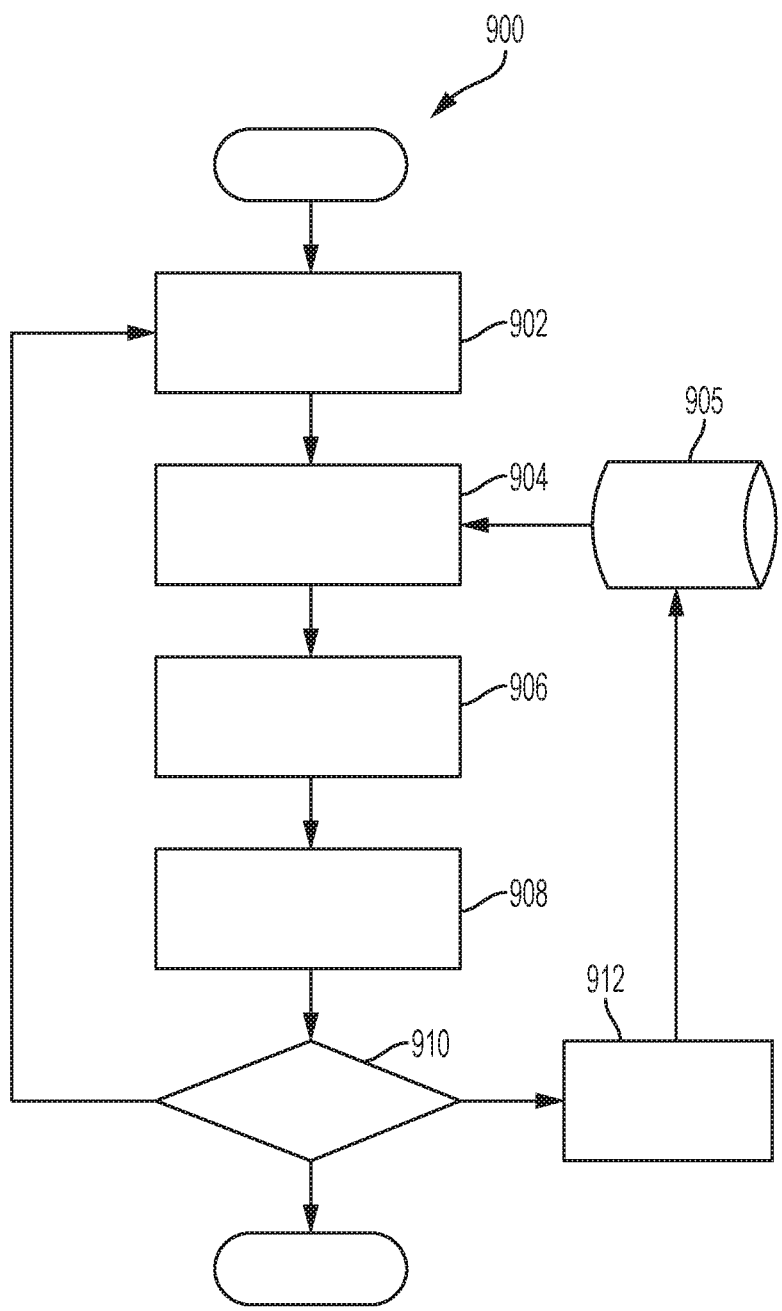
FIG. 9 shows a flowchart of a method for detecting an offset for fuel level sensor fault in accordance with one embodiment.

Turning now to FIG. 9, a flowchart 900 is shown for a method for detecting an offset for fuel level sensor fault in accordance with one embodiment. In this embodiment, the fuel level sensor reading is taken as an electrical resistance reading from the potentiometer of the fuel sensor 902. The electrical resistance reading is used to generate a fuel level estimate 904 from a fuel usage table 905 retrieved from an electronic data storage device. The fuel level sensitivity is calculated based on a predetermined sensitivity curve 906 derived from the fuel usage table. The fuel level estimate is compared to the sensitivity curve 908 to determine if an offset is required 910. If the offset is required, it is added as an update to the fuel estimate table 912 and stored in the electronic data storage device 905.

Figure 10A:
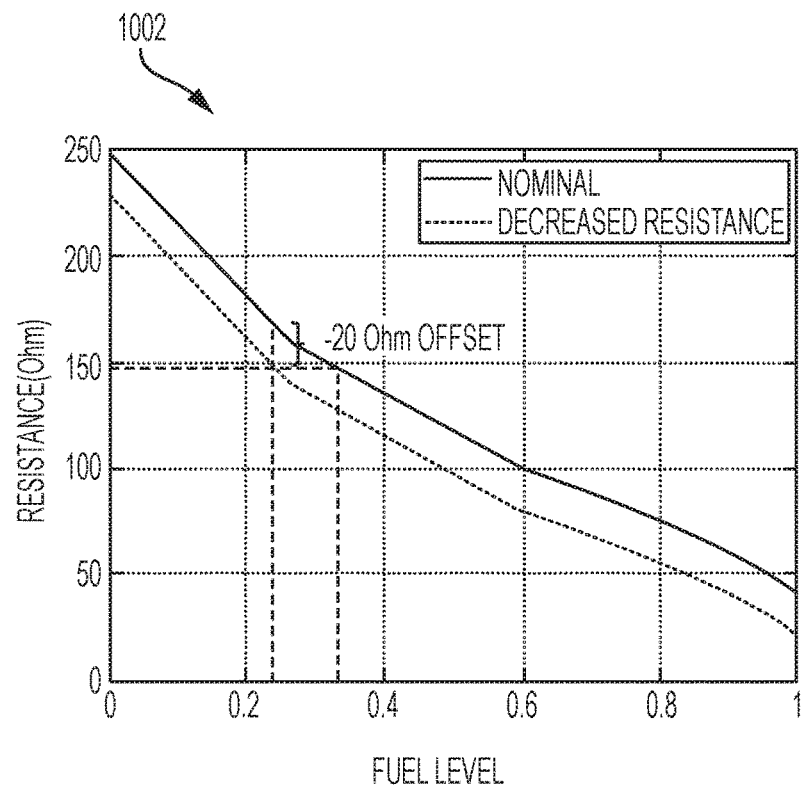
FIGS. 10A and 10B show example charts of determining an offset for a fuel level sensor sensitivity curve graph ($\Delta R/\Delta F$) compared with the corresponding fuel level graph in accordance with one embodiment.
Figure 10B:
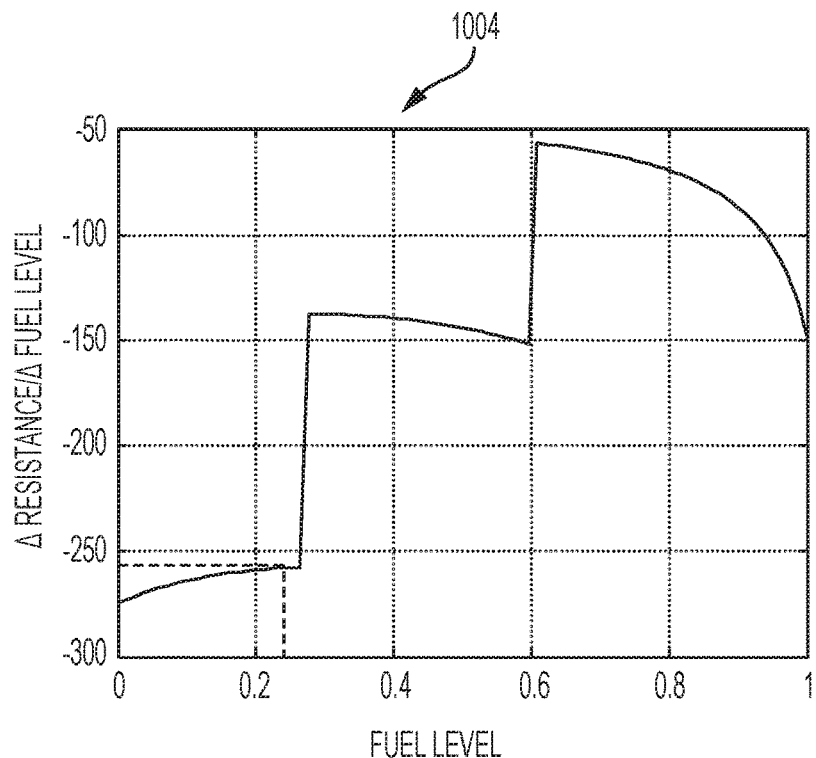

Turning now to FIGS. 10A and 10B, a fuel usage graph 1002 and a sensitivity graph 1004 are shown to determine offset values in an example of one embodiment. In this example, FIGS. 10A and 10B show a fuel usage graph 1002 where the nominal electrical resistance reading is 150 ohms. This indicates a fuel level of approximately 33% capacity. The corresponding measured $\Delta R/\Delta T$ value on the sensitivity curve is −260 which indicates a fuel level of approximately 25% capacity. This value conflicts with the nominal value (25% v. 335) which indicates the presence of less fuel in the tank than is indicated by the nominal value. The need for an offset is thus confirmed and the value of 25% fuel capacity is measured on the fuel usage table. In this example, a 150 ohms resistance value on the fuel usage chart that is cross-referenced with a 25% fuel capacity requires a −20 ohm offset value 1006 to be applied to the nominal reading in order to provide a correct fuel level value. This offset of −20 ohms 1006 is then updated to the fuel usage table for all future estimates using the fuel usage table.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for determining an offset detection for a fuel level sensor fault, comprising:
   receiving an electrical resistance reading from a potentiometer of a fuel level sensor;
   generating an estimated fuel level based on a predetermined fuel usage table, wherein the predetermined usage table is stored on electronic data storage device for later retrieval and used to estimate the fuel level based on the electrical resistance reading from the potentiometer;
   calculating the fuel level sensitivity based on the change in electrical resistance readings divided by the change in the estimated fuel levels ($\Delta R/\Delta F$);
   determining any necessary offset to the electrical resistance reading by comparing the fuel level sensitivity to a sensitivity curve, wherein the sensitivity curve is derived from the predetermined fuel usage table; and
   updating the predetermined fuel usage table with the necessary offset to the electrical resistance reading.

2. The method of claim 1, where the potentiometer is divided into an initial region, an intermediate region, and final region and where each region has a different electrical resistance sensitivity range.

3. The method of claim 2, where the fuel level sensitivity is calculated at a boundary edge between the initial region and the intermediate region of the potentiometer.

4. The method of claim 2, where the fuel level sensitivity is calculated at a boundary edge between the intermediate region and the final region of the potentiometer.

5. The method of claim 2, where the fuel level sensitivity is calculated at a trajectory of the change in the estimated fuel levels ($\Delta R/\Delta F$) in the initial region of the potentiometer.

6. The method of claim 2, where the fuel level sensitivity is calculated at a trajectory of the change in the estimated fuel levels ($\Delta R/\Delta F$) in the intermediate region of the potentiometer.

7. The method of claim 2, where the fuel level sensitivity is calculated at a trajectory of the change in the estimated fuel levels ($\Delta R/\Delta F$) in the final region of the potentiometer.

8. A system for calculating an offset detection for a fuel level sensor fault, comprising:
   a fuel level sensor, comprising,
   a float arm that pivots to according to a change in the fuel level,
   a potentiometer connected to the base of the float arm, so a connector point of the potentiometer rotates according to the position of the float arm,
   a variable resistor in contact with the connector point of the potentiometer, where the variable resistor generates an electrical resistance reading that varies based on the position of the connector point;
   an electronic data storage device that contains a predetermined fuel usage table that estimates the fuel level by referencing the electrical resistance reading from the fuel level sensor, wherein the predetermined usage table is stored on electronic data storage device for later retrieval; and
   an electronic microprocessor that,
   calculates fuel level sensitivity based on the change in electrical resistance readings divided by the change in the estimated fuel levels ($\Delta R/\Delta F$);
   determines any necessary offset to the electrical resistance reading by comparing the fuel level sensitivity to a sensitivity curve that is stored in the electronic data storage device, wherein the sensitivity curve is derived from the predetermined fuel usage table, and
   updates the predetermined fuel usage table with the necessary offset to the electrical resistance reading.

9. The method of claim 8, where the fuel level sensitivity is calculated based on a nonlinear curve of the change in the ($\Delta R/\Delta F$) value v. the fuel level, where the nonlinear curve is derived by variable thickness in the variable resistor that provides the electrical resistance.

10. The method of claim 8, where the fuel level sensitivity is calculated based on a nonlinear curve of the change in the (ΔR/ΔF) value v. the fuel level, where the nonlinear curve is derived by a mapped sine wave function generated by the height (H) of the float arm v. the angle of the arm (θ) multiplied by the length (L) of the arm (H=L*sin θ).

11. The system of claim 8, where the variable resistor is divided into an initial region, an intermediate region, and final region and where each region has a different electrical resistance sensitivity range.

12. The system of claim 11, where the final region of the variable resistor has a greater electrical resistance sensitivity than the intermediate region.

13. The system of claim 11, where the final region of the variable resistor has a greater electrical resistance sensitivity than the initial region.

14. The system of claim 8, where the fuel usage table comprises a primary fuel usage table and a complementary fuel usage table.

15. The system of claim 14, where the primary fuel usage table has a higher value resolution that the complementary fuel usage table.

16. The system of claim 14, where the complementary fuel usage table acts as a backup check for the primary fuel usage table.

17. The system of claim 14, where the electronic microprocessor updates the primary fuel usage table with the offset to the electrical resistance reading.

18. A vehicle that calculates an offset detection for a fuel level sensor fault, comprising:

a fuel level sensor, comprising,
a float arm that pivots to according to a change in the fuel level of a fuel tank for the vehicle,
a potentiometer connected to the base of the float arm, so a connector point of the potentiometer rotates according to the position of the float arm,
a variable resistor in contact with the connector point of the potentiometer, where the variable resistor generates an electrical resistance reading that varies based on the position of the connector point;
an electronic data storage device that contains a predetermined fuel usage table that estimates the fuel level in the fuel tank by referencing the electrical resistance reading from the fuel level sensor, wherein the predetermined usage table is stored on electronic data storage device for later retrieval; and
an electronic microprocessor that,
calculates fuel level sensitivity based on the change in electrical resistance readings divided by the change in the estimated fuel levels (ΔR/ΔF);
determines any necessary offset to the electrical resistance reading by comparing the fuel level sensitivity to a sensitivity curve that is stored in the electronic data storage device, wherein the sensitivity curve is derived from the predetermined fuel usage table; and
updates the predetermined fuel usage table with the necessary offset to the electrical resistance reading.

19. The vehicle of claim 18, where the estimate of the fuel level in the fuel tank is shown with an analog fuel gauge.

20. The vehicle of claim 18, where the estimate of the fuel level in the fuel tank is shown with a digital fuel gauge.

* * * * *